(12) United States Patent
Boldyrev et al.

(10) Patent No.: US 9,274,898 B2
(45) Date of Patent: Mar. 1, 2016

(54) METHOD AND APPARATUS FOR PROVIDING CRITICALITY BASED DATA BACKUP

(75) Inventors: Sergey Boldyrev, Söderkulla (FI); Pavandeep Kalra, Shrewsbury, MA (US)

(73) Assignee: Nokia Technologies Oy, Espoo (FI)

( * ) Notice: Subject to any disclaimer, the term of this patent is extended or adjusted under 35 U.S.C. 154(b) by 707 days.

(21) Appl. No.: 13/228,845

(22) Filed: Sep. 9, 2011

(65) Prior Publication Data

US 2013/0067181 A1 Mar. 14, 2013

(51) Int. Cl.
G06F 12/00 (2006.01)
G06F 13/00 (2006.01)
G06F 13/28 (2006.01)
G06F 11/14 (2006.01)

(52) U.S. Cl.
CPC .................................. *G06F 11/1458* (2013.01)

(58) Field of Classification Search
CPC ......................... G06F 12/0866; G06F 11/1461
USPC ........................................... 711/162, E12.103
See application file for complete search history.

(56) References Cited

U.S. PATENT DOCUMENTS

| | | | |
|---|---|---|---|
| 6,466,980 B1 | 10/2002 | Lumelsky et al. | |
| 7,801,867 B2 | 9/2010 | Mittal et al. | |
| 8,001,087 B1 | 8/2011 | Newstadt et al. | |
| 8,214,484 B2 | 7/2012 | Arora et al. | |
| 2005/0033757 A1 | 2/2005 | Greenblatt et al. | |
| 2006/0240990 A1 | 10/2006 | Reich | |
| 2007/0022122 A1 | 1/2007 | Bahar et al. | |
| 2007/0078972 A1 * | 4/2007 | Yagishita | 709/224 |
| 2007/0098019 A1 | 5/2007 | Kelly et al. | |
| 2007/0192386 A1 | 8/2007 | Fries et al. | |
| 2008/0046483 A1 | 2/2008 | Lehr et al. | |
| 2008/0077715 A1 | 3/2008 | Kochunni et al. | |
| 2008/0828204 | 11/2008 | Miura | |
| 2009/0300633 A1 | 12/2009 | Altrichter et al. | |

(Continued)

FOREIGN PATENT DOCUMENTS

| | | |
|---|---|---|
| JP | 2000-270010 A | 9/2000 |
| JP | 2010-225021 A | 10/2010 |

OTHER PUBLICATIONS

Office Action for related U.S. Appl. No. 13/221,452 dated Aug. 15, 2012, pp. 1-22.
S. Magladry, "The Gold Rule of Data: Only Backup the Data That is Important to You", pp. 1-11, retrieved form Internet on May 24, 2012, <http://biznik.com/articles/the-gold-rule-of-data-only-backup-the-data-that-is-important-to-you >.

(Continued)

*Primary Examiner* — Charles Rones
*Assistant Examiner* — Sidney Li
(74) *Attorney, Agent, or Firm* — Alston & Bird LLP

(57) ABSTRACT

An approach is provided for providing criticality based data backup. A data backup platform determines one or more state trajectories associated with one or more information management processes operating on at least one information space. The data backup platform further processes and/or facilitates a processing of the one or more state trajectories to determine criticality information associated with one or more data items of the at least one information space. The data backup platform also determines (a) one or more data backup processes, (b) one or more data restoration processes, (c) one or more parameters for the one or more data backup processes, the data restoration processes, or a combination thereof, or (d) a combination thereof based, at least in part, on the criticality information.

22 Claims, 13 Drawing Sheets

(56) References Cited

U.S. PATENT DOCUMENTS

2010/0145771 A1  6/2010  Fligler et al.
2010/0205150 A1  8/2010  Prahlad et al.
2010/0274762 A1  10/2010 Murphy et al.
2010/0274983 A1  10/2010 Murphy et al.
2011/0082972 A1  4/2011  Cherkasova et al.
2011/0145303 A1  6/2011  Boldyrev et al.

OTHER PUBLICATIONS

Notification of Transmittal of the International Search Report and The Written Opinion of the International Searching Authority, or the Declaration for International Application No. PCT/FI2012/050769, dated Feb. 12, 2013, pp. 1-24.

* cited by examiner

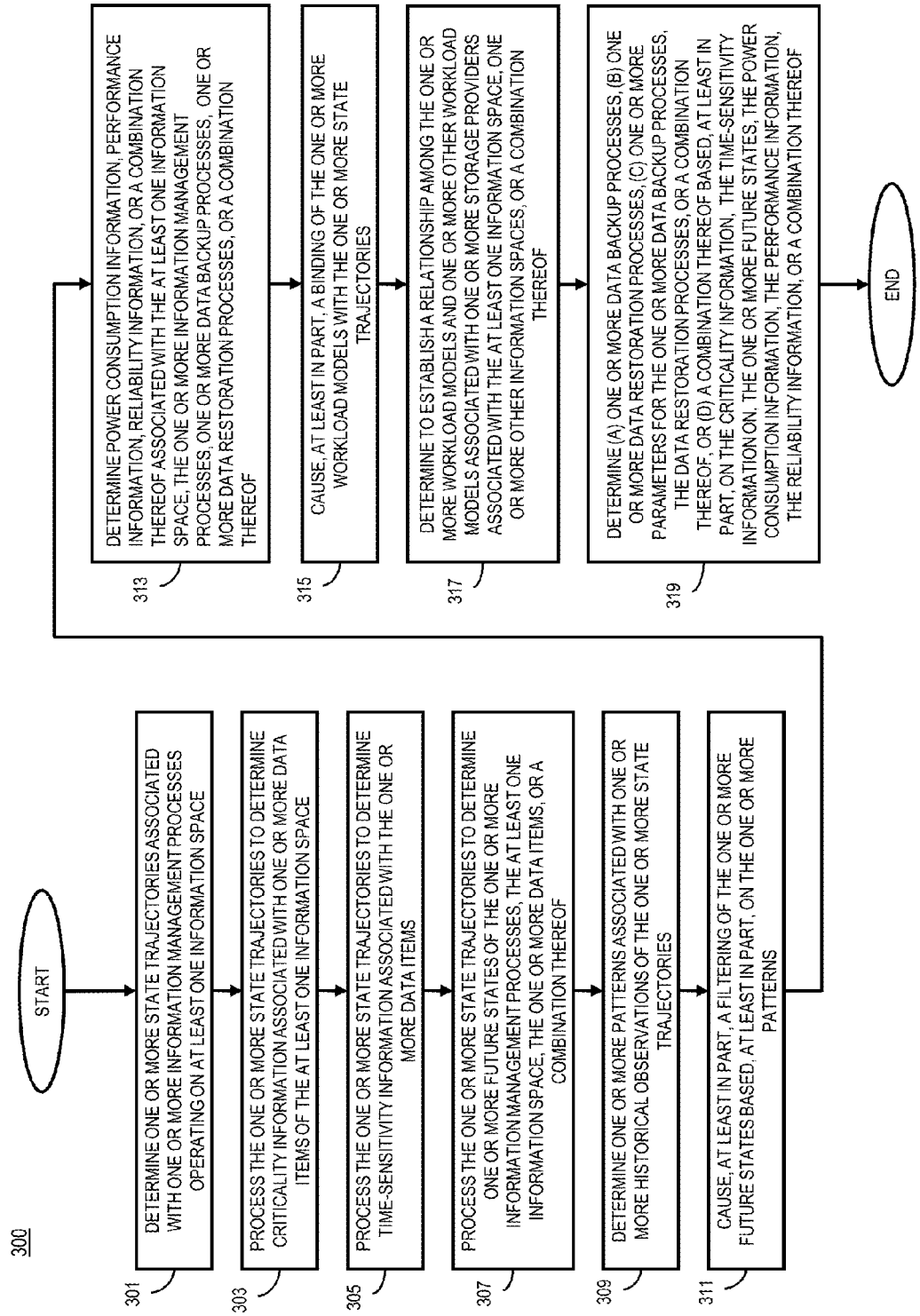

400

METHOD AND APPARATUS FOR PROVIDING CRITICALITY BASED DATA BACKUP

BACKGROUND

Service providers (e.g., wireless, cellular, etc.) and device manufacturers are continually challenged to deliver value and convenience to consumers by, for example, providing compelling network services. These services are leading to vast amounts of data (structured and binary) which need to be managed, stored, searched, analyzed, etc. Over the last decade, the internet services have accumulated data in the range of exabytes ($10^{16}$ bytes). Although most of this data is not structured in nature, however, it must be stored, searched and analyzed appropriately before any real time information can be drawn from it for providing services to the users.

In order to provide high availability of such a huge amount of data, most systems backup their entire dataset regularly and under specific conditions. In such systems, in case of the occurrence of adverse conditions, the whole dataset can be recovered (e.g. restored from the backup). However, providing backup of a total dataset is the most conservative way of ensuring data security and in any case leading to data losses, the system can always recover at least to the last state prior to the loss. However with large amounts of data, backing up exabytes or petabytes of data is no longer feasible from either cost or recovery perspective.

Some Example Embodiments

Therefore, there is a need for an approach for providing criticality based data backup in which only data which is deemed critical at the time of backup, is backed up.

According to one embodiment, a method comprises determining one or more state trajectories associated with one or more information management processes operating on at least one information space. The method also comprises processing and/or facilitating a processing of the one or more state trajectories to determine criticality information associated with one or more data items of the at least one information space. The method further comprises determining (a) one or more data backup processes, (b) one or more data restoration processes, (c) one or more parameters for the one or more data backup processes, the data restoration processes, or a combination thereof, or (d) a combination thereof based, at least in part, on the criticality information.

According to another embodiment, an apparatus comprises at least one processor, and at least one memory including computer program code for one or more computer programs, the at least one memory and the computer program code configured to, with the at least one processor, cause, at least in part, the apparatus to determine one or more state trajectories associated with one or more information management processes operating on at least one information space. The apparatus is also caused to process and/or facilitate a processing of the one or more state trajectories to determine criticality information associated with one or more data items of the at least one information space. The apparatus is further caused to determine (a) one or more data backup processes, (b) one or more data restoration processes, (c) one or more parameters for the one or more data backup processes, the data restoration processes, or a combination thereof, or (d) a combination thereof based, at least in part, on the criticality information.

According to another embodiment, a computer-readable storage medium carries one or more sequences of one or more instructions which, when executed by one or more processors, cause, at least in part, an apparatus to determine one or more state trajectories associated with one or more information management processes operating on at least one information space. The apparatus is also caused to process and/or facilitate a processing of the one or more state trajectories to determine criticality information associated with one or more data items of the at least one information space. The apparatus is further caused to determine (a) one or more data backup processes, (b) one or more data restoration processes, (c) one or more parameters for the one or more data backup processes, the data restoration processes, or a combination thereof, or (d) a combination thereof based, at least in part, on the criticality information.

According to another embodiment, an apparatus comprises means for determining one or more state trajectories associated with one or more information management processes operating on at least one information space. The apparatus also comprises means for processing and/or facilitating a processing of the one or more state trajectories to determine criticality information associated with one or more data items of the at least one information space. The apparatus further comprises means for determining (a) one or more data backup processes, (b) one or more data restoration processes, (c) one or more parameters for the one or more data backup processes, the data restoration processes, or a combination thereof, or (d) a combination thereof based, at least in part, on the criticality information.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 3 is a flowchart of a process for providing criticality based data backup, according to one embodiment;

DESCRIPTION OF SOME EMBODIMENTS

Figure 1:
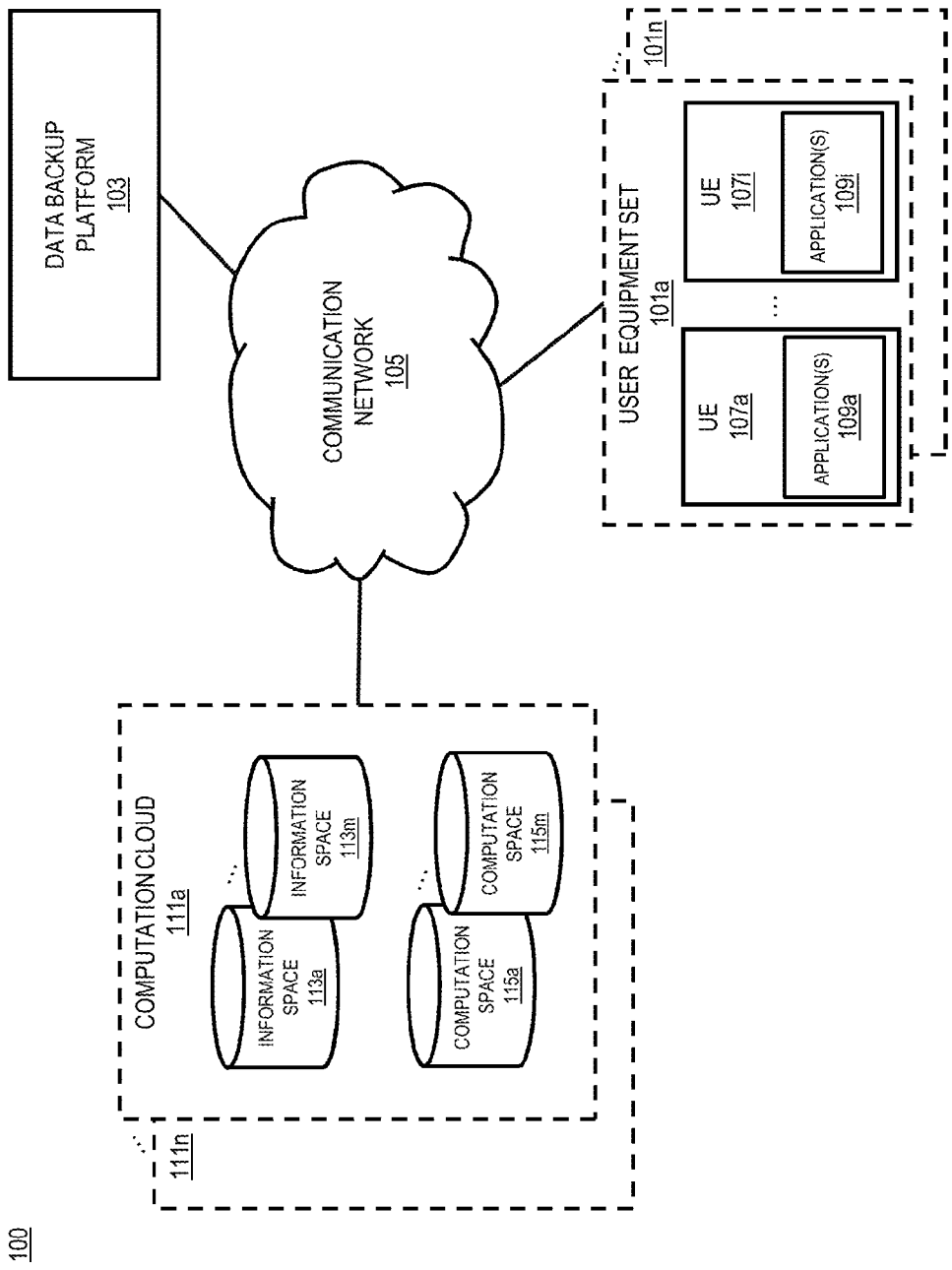
FIG. 1 is a diagram of a system capable of providing criticality based data backup, according to one embodiment.

Examples of a method, apparatus, and computer program for providing criticality based data backup are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "computation closure" identifies a particular computation procedure together with relations and communications among various processes including passing arguments, sharing process results, selecting results provided from computation of alternative inputs, flow of data and process results, etc. The computation closures (e.g., a granular reflective set of instructions, data, and/or related execution context or state) provide the capability of slicing of computations for processes and transmitting the computation slices between devices, infrastructures and information sources.

As used herein, the term "cloud" refers to an aggregated set of information and computation closures from different sources. This multi-sourcing is very flexible since it accounts and relies on the observation that the same piece of information or computation can come from different sources. In one embodiment, information and computations within the cloud are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information and computations that is implemented in web resources; using a variety of syntax formats. Although various embodiments are described with respect to clouds, it is contemplated that the approach described herein may be used with other structures and conceptual description methods used to create distributed models of information and computations.

In one embodiment, according to a definition by the National Institute of Standards and Technology (NIST), cloud computing is a model for enabling convenient, on-demand network access to a shared pool of configurable computing resources (e.g., networks, servers, storage, applications, and services) that can be rapidly provisioned and released with minimal management effort or service provider interaction. This cloud model promotes availability and is composed of five essential characteristics, three service models, and four deployment models. The essential characteristics of the cloud model consist of on-demand self-service, broad network access, resource pooling, rapid elasticity, and measured Service.

The on-demand self-service characteristic of the cloud model enables a consumer to unilaterally provision computing capabilities, such as server time and network storage, as needed automatically without requiring human interaction with each service's provider.

The broad network access characteristic of the cloud model provides capabilities available over the network that can be accessed through standard mechanisms that promote use by heterogeneous thin or thick client platforms (e.g., mobile phones, laptops, and PDAs).

Based on the resource pooling characteristic of the cloud model, the provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

The rapid elasticity of the cloud model provides rapid and elastic, and in some cases automatic, provision of capabilities to quickly scale out and rapid release to quickly scale in. To the consumer, the capabilities available for provisioning often appear to be unlimited and can be purchased in any quantity at any time.

According to the measured service characteristic, cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Furthermore, the service models associated with the cloud model include Cloud Software as a Service (SaaS), Cloud Platform as a Service (PaaS), and Cloud Infrastructure as a Service (IaaS).

The Cloud Software as a Service (SaaS) provides, to the customer, the capability to use the provider's applications running on a cloud infrastructure. The applications are accessible from various client devices through a thin client interface such as a web browser (e.g., web-based email). According to this service model, the consumer does not manage or control the underlying cloud infrastructure including network, servers, operating systems, storage, or even individual application capabilities, with the possible exception of limited user-specific application configuration settings.

The Cloud Platform as a Service (PaaS) provides, to the customer, the capability to deploy onto the cloud infrastructure consumer-created or acquired applications created using programming languages and tools supported by the provider. According to this service model, the consumer does not manage or control the underlying cloud infrastructure including network, servers, operating systems, or storage, but has control over the deployed applications and possibly application hosting environment configurations.

The Cloud Infrastructure as a Service (IaaS) provides, to the customer, the capability to provision processing, storage, networks, and other fundamental computing resources where the consumer is able to deploy and run arbitrary software, which can include operating systems and applications. According to this service model, the consumer does not manage or control the underlying cloud infrastructure but has control over operating systems; storage, deployed applications, and possibly limited control of select networking components (e.g., host firewalls).

Additionally, a cloud model can be deployed as a private cloud, a community cloud, a public cloud, or a hybrid cloud. In one embodiment, according to a private cloud model, the cloud infrastructure is operated solely for an organization. It may be managed by the organization or a third party and may exist on premise or off premise. Alternatively, a community cloud infrastructure is shared by several organizations and supports a specific community that has shared concerns (e.g., mission, security requirements, policy, and compliance considerations). It may be managed by the organizations or a third party and may exist on premise or off premise. A public cloud infrastructure is made available to the general public or a large industry group and is owned by an organization selling cloud services. Finally, a hybrid cloud infrastructure is a composition of two or more clouds (private, community, or public) that remain unique entities but are bound together by standardized or proprietary technology that enables data and application portability (e.g., cloud bursting for load-balancing between clouds).

FIG. 1 is a diagram of a system capable of providing criticality based data backup, according to one embodiment. Typically it is hard to determine the level of criticality of data is hard due to the fact that data platform systems are built with generic un-awareness of the applications running on top of the system.

There are situations in which a cost effective backup/recovery mechanism is highly beneficial. In one embodiment, a provider of maps and navigation systems may start collecting three dimensional (3D) images in order to be able to provide better details for maps and navigation. The volume of data for just one of the services provided may rise from the current volume (about 2 petabytes) to 50 petabytes in the next two years. As a result, the cost of backing up the data may rise by 25 folds in two years. However, if only the data needed for retaining the accuracy of pictures were backed up and some of the image granularity was to be compromised, the volume of the 2 years prospect of data could be reduced to 10 petabytes resulting in a net cost increase of only 5 folds over two years time for the purpose of backup.

In another embodiment, a provider of maps and navigation may need to recover 50 petabytes of data due to a disaster which takes the data center down. In order to recover the 50 petabytes of data, depending on the network speed, it may take up to 24 hours to recover the full dataset. However if only a fraction of data is backed up; and the system is given the ability to recover to a reasonable state, then it may only take around 5 hours to recover to an operational state.

Therefore, a key issue that needs to be addressed is how to enable applications to determine (e.g. tag) criticality of the data they handle, determine data criticality in real time, and use the criticality information to make effective decisions on backing up the data.

Although backing up all the data is not an efficient way of providing availability, backing up only the data space which is critical can ensure a cost effective and a more efficient recovery mechanism for a data platform. Additionally, time sensitiveness of data may affect data recovery.

To address this problem, a system 100 of FIG. 1 introduces the capability to provide criticality based data backup and recovery. In one embodiment, the data backup platform 103 treats data management process as a regular periodic motion of a dynamic information flow of a certain number of information trajectories. For example, an information trajectory, similar to a motion trajectory, provides a mapping of information flow through information spaces 113*a*-113*m*.

In one embodiment, the process for prediction of the state of information constitutes of sequences of observation of the most recent state trajectory (attractor). The trajectory defines a finite set of possible future states at given point in the (nearest) future. This knowledge is then leveraged in controlling the process management, identifying the most critical parts of the data and determining the optimal working parameters, including information fragments, for the process. The set of possible future states can be further reduced by observing the history of the aspects and by extracting the patterns in their sequences. The transition between the states can be initiated by means of aspects (e.g. regulation rules, semantic rules). The aspects can represent any possible impact of any external entity that can utilize that particular intelligent information management process. Predicting the future impacts (information consumers and providers) to the system significantly improves the accuracy of the state trajectory prediction, and therefore, improves overall utilization of any fragments of information.

In one embodiment, the prediction process is based, at least in part, on power consumption. Various end-to-end setups, for example for communication between user equipments and computation clouds may have different power budgets and constraints (e.g. using battery vs. main power). The power consumption associated with connection maintenance and data transfer between devices varies and can be considered in prediction process.

In one embodiment, future latency requirement (e.g. performance requirement) for each storage unit is estimated by monitoring the local and remote workloads. The storage consumers may provide additional latency requirements for the prediction process.

In one embodiment, due to dynamic nature of communication systems, some storage providers may not be available at all times. This compromises the reliability and availability of the data. In order to provide data to consumers in such conditions, redundancy of data can be increased. For example, data can be replicated to several storage providers or it can be dispersed to minimize the data loss if one or more storage provides become unavailable.

In one embodiment, operational strategies are selected in terms of one or more of the dimensions power consumption, performance, and reliability as described. For example a strategy can aim at minimizing the power consumption while meeting the latency and reliability constraints. Latency minimization and reliability maximization strategies are constructed in a similar way. Furthermore, by introducing weighting factors for each dimension, multiple (or all) dimensions can be optimized simultaneously.

The operational strategies may consider storage space constraints as a prime limitation of any physical storage device. In one embodiment, the prediction process constitutes of sequences of observations of the most recent state trajectory. It is noted that there is a natural relationship between the amount of storage space with any of the parameters of power consumption, performance, and reliability.

In one embodiment, the process of identifying the most critical parts of the data and determining the optimal working parameters may include information fragments, consume a particular additional storage and computational space which may cause additional power consumption and changes in reliability and performance (in particular latency). If the critical content is replicated, the predicted blocks of data incur additional storage space needs and consumption is growing further. In that scope any increase of a redundancy (in terms of pure disperse or replication, or a combination thereof) leads to changes in terms of power consumption, data reliability and performance, thus providing a relationship between storage space and computational consumption and the three parameters.

As shown in FIG. 1, the system 100 comprises sets 101a-101n of user equipments (UEs) 107a-107i having connectivity to the data backup platform 103 via a communication network 105. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107a-107i are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

In various embodiments, different flow diagrams can be considered as the main sequence of data management process. For example, in one embodiment, the access pattern to the data can be assumed to be a "read any, write many" access which is energy efficient and masks the latency. Additionally, it can be initially assumed that a number of data requests per a certain period of time is viewed as an infinite moving average.

In one embodiment, the future states can be predicated based on the Autoregressive Integrated Moving Average (ARIMA) model which is a statistical model fitted to time series data in order to predict future values (e.g. states) of the data.

In one embodiment, broken bursts or streams are detected and requests per period are pre-processed via wavelet analysis which is a mathematical method for cutting up data into different frequency components, so that each component can be analyzed with a resolution matched to its own scale.

In one embodiment, following the prediction of future states and detection of streams of data, the run-time spectrum data components are detected leading to the detection of most critical content (data).

In one embodiment, upon the detection of critical data, a spectral forecast using the ARIMA model is performed based on the detected run-time spectrum components, the performance (e.g. Input/output per second or IOPS) or a combination thereof for bandwidth mapping estimation and allocation.

In one embodiment, repeatable run-time spectrum components may represent local request, while non-repeatable run-time spectrum components represent external requests (e.g. feedbacks).

In one embodiment, the data model is reconstructed based on data model characteristics calculation and the tracking of information trajectory, using predictive controller and information trajectory.

In one embodiment, the efficiency is estimated based on content reliability (feedback) from storage providers. Additionally, the error estimation and tracking is performed for further optimization.

In one embodiment, the workload model is considered based, at least in part, on feed-forward control scheme which can be represented in form of single-input single-output (SISO) model. The workload model is also bound with information trajectories of information flow which characterize the user and revise the workload as part of a multiple-input multiple-output (MIMO) model.

It is noted that a corresponding single-input single-output (SISO) model can be considered as a part of distributed data management in case of multiple content producers and multiple content consumers, where the MIMO model is rendered. And, such MIMO model can be used to represent a distributed computing environment which is a dynamically changing system with multitude of uncertainties. A certain type of distributed control can provide robust infrastructure to monitor the status of the dynamically changing system.

By way of example, the UEs 107a-107i and the data backup platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
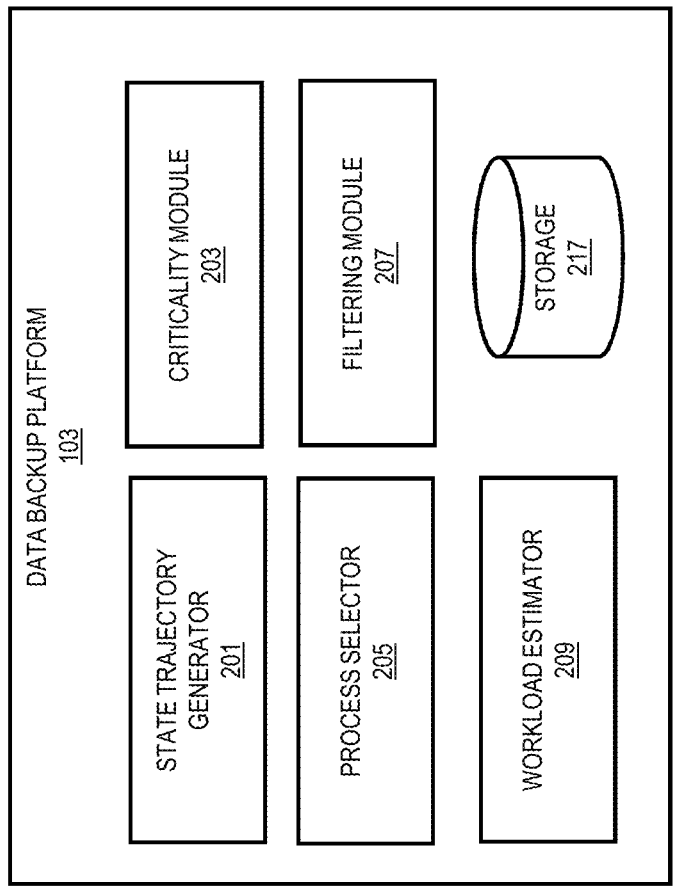
FIG. 2 is a diagram of the components of data backup platform, according to one embodiment.

FIG. 2 is a diagram of the components of a data backup platform, according to one embodiment. By way of example, the data backup platform 103 includes one or more components for providing criticality based data backup. It is contemplated that the functions of these components may be combined in one or more components or performed by other components of equivalent functionality. In this embodiment, the data backup platform 103 includes a state trajectory generator 201, a criticality module 203, a process selector 205, a filtering module 207, a central workload estimator 209, and a storage 211.

Figure 9:
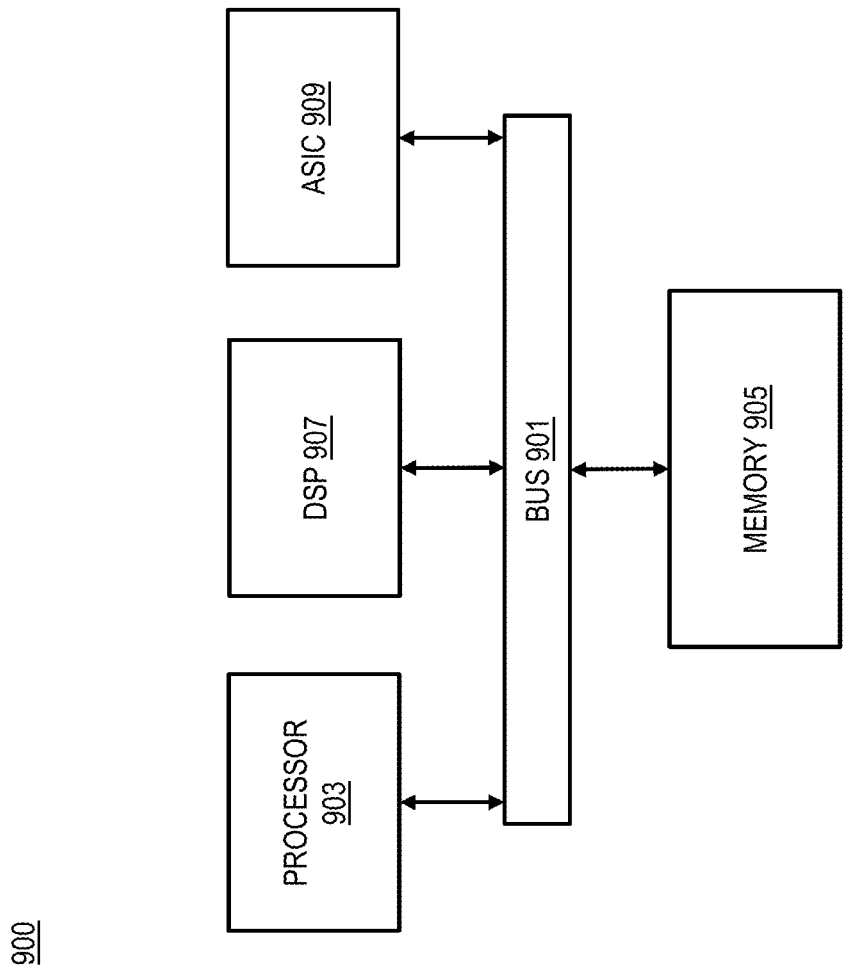
FIG. 9 is a diagram of a chip set that can be used to implement an embodiment of the invention.

FIG. 2 is described with reference to FIG. 3, wherein FIG. 3 shows a flowchart 300 of a process for providing criticality based data backup, according to one embodiment. In one embodiment, the data backup platform 103 performs the process 300 and is implemented in, for instance, a chip set including a processor and a memory as shown in FIG. 9.

In one embodiment, per step 301 of process 300 of FIG. 3, the state trajectory generator 201 determines one or more state trajectories associated with one or more information management processes operating on at least one information space 113a-113m of computation clouds 111a-111n.

The state trajectory generator 201 may determine the one or more information state trajectories based, at least in part, on various determination factors such as, for example, an inference action, a conceptual clustering, an analogy creation, one or more working conditions, a fault prediction, one or more usage patterns, a workload estimation, or a combination thereof.

The inference action is related to actions leading to inference of the data. The state trajectory generator 201 can use the inference actions to determine how each action can provide a future state from a current state. The conceptual clustering consists of clustering the data not only based on the inherent structure of the data but also the descriptions available on the data, such as for example, data associated with an event, news, location, etc. The state trajectory generator 201 can use the conceptual clustering to determine information state trajectories based on commonality or differences among conceptual clusters the data is part of. The analogy creation includes creating interpretations of data using other related data. The working conditions, fault prediction, usage pattern, and workload estimation are other determination factors, associating extra metadata to the data items of the information space 113a-113m, in order to be able to analyze and categorize the data in a more efficient way and provide trajectories with higher accuracy.

In one embodiment, per step 303 of FIG. 3, the criticality module 203 processes and/or facilitates a processing of the one or more state trajectories to determine criticality information associated with one or more data items of the at least one information space 113a-113m.

In one embodiment, per step 305 of FIG. 3, the criticality module 203 processes and/or facilitates a processing of the one or more state trajectories to determine time-sensitivity information associated with the one or more data items of the at least one information space 113a-113m.

In one embodiment, per step 307 of FIG. 3, the criticality module 203 processes and/or facilitates a processing of the one or more state trajectories to determine one or more future states of the one or more information management processes, the at least one information space 113a-113m, the one or more data items, or a combination thereof.

In one embodiment, per step 309 of FIG. 3, the filtering module 207 determines one or more patterns associated with one or more historical observations of the one or more state trajectories. The historical observations may be stored in storage 211 and analyzed by the filtering module 207 for extracting patterns associated with data access.

In one embodiment, per step 311 of FIG. 3, the filtering module 207 causes, at least in part, a filtering of the one or more future states determined by the criticality module 203 based, at least in part, on the one or more patterns.

In one embodiment, per step 313 of FIG. 3, the criticality module 203 determines power consumption information, performance information, reliability information, or a combination thereof associated with the at least one information space 113a-113m, the one or more information management processes, one or more data backup processes, one or more data restoration processes, or a combination thereof.

In one embodiment, the power consumption information, the performance information, the reliability information, or a combination thereof are determined based, at least in part, on one or more workload models.

In one embodiment, per step 315 of FIG. 3, the central workload estimator 209 causes, at least in part, a binding of the one or more workload models with the one or more state trajectories.

In one embodiment, per step 317 of FIG. 3, the central workload estimator 209 determines to establish a relationship among the one or more workload models and one or more other workload models associated with one or more storage providers associated with the at least one information space 113a-113m, one or more other information spaces, or a combination thereof. The one or more workload models can be local workload models, aggregated workload models, or a combination thereof.

In one embodiment, the relationship among the one or more workload models and one or more other workload models associated with one or more storage providers associated with the at least one information space 113a-113m, one or more other information spaces, or a combination thereof is based, at least in part, on a multiple-input multiple-output (MIMO) model, a single-input single-output (SISO) model, or a combination thereof.

In one embodiment, per step 319 of FIG. 3, the process selector 205 determines (a) the one or more data backup processes, (b) the one or more data restoration processes, (c) the one or more parameters for the one or more data backup processes, the data restoration processes, or a combination thereof, or (d) a combination thereof based, at least in part, on the criticality information, the time-sensitivity information, the one or more future states, the power consumption information, the performance information, the reliability information, or a combination thereof.

In various embodiments, the on the criticality information, the time-sensitivity information, the one or more future states, the power consumption information, the performance information, the reliability information, or a combination thereof can be stored in storage 211, on information spaces 113a-113m, on any other storage spaces available via communication network 105, or a combination thereof.

Figure 4A:
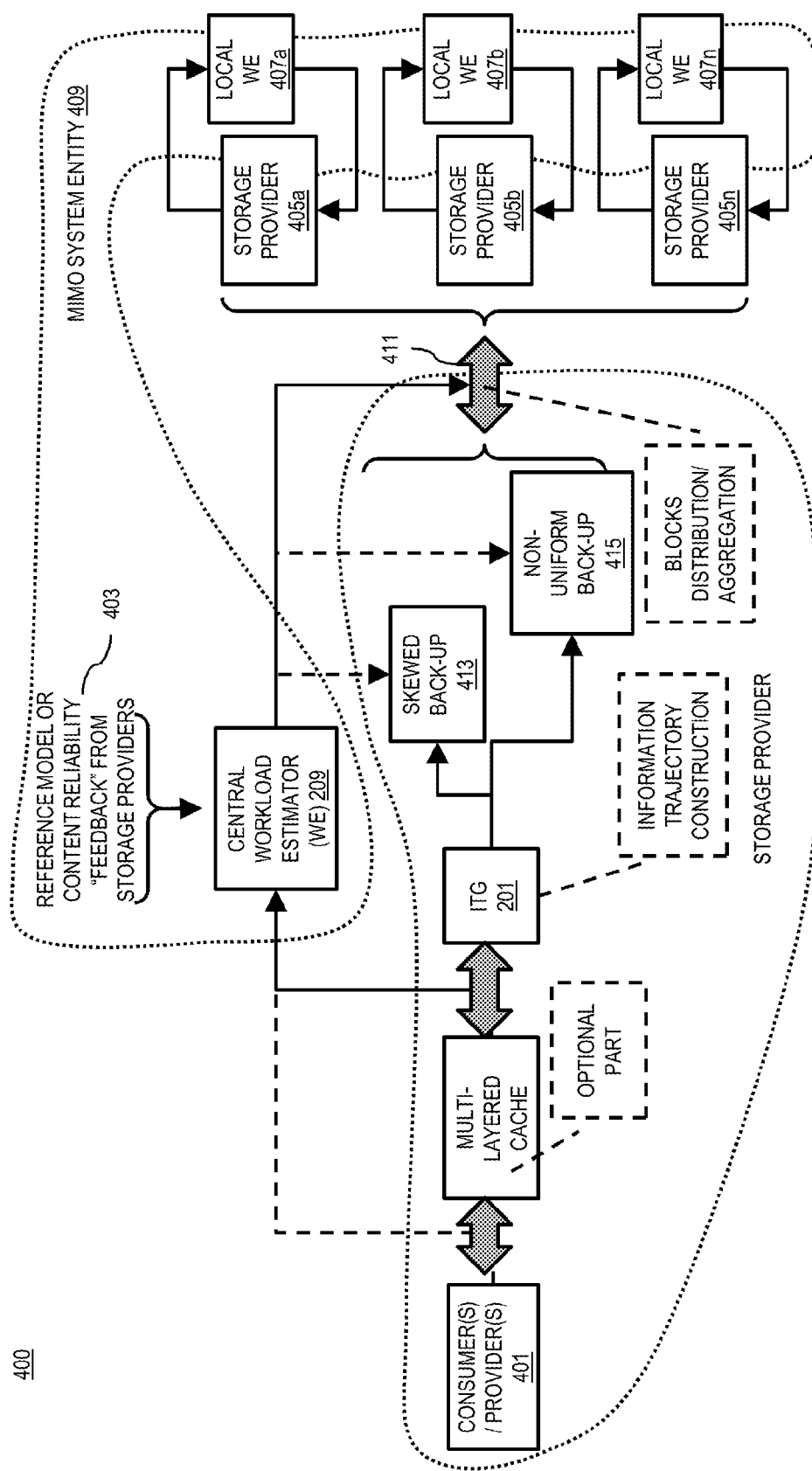
FIG. 4A is a diagram of a local workload estimation, according to one embodiment.

FIG. 4A is a diagram of a local workload estimation, according to one embodiment. In one embodiment, at any moment of time, the actual content distribution process 400 assumes that certain number of storage consumers and providers 401 are connected by means of a network (not shown). According to the content, backup and distribution policies and appropriate actions are undertaken by the data backup platform 103. However, to provide a robust predictive behavior of content distribution, propagation and aggregation, a form of predictive control is used.

In one embodiment, a workload estimation mechanism is implemented as a feed-forward component (e.g., the central workload estimator 209) which is a predictive controller. The central workload estimator 209 estimates a workload model using the information trajectory generated by the information trajectory generator (ITG) 201, the information (e.g. requirements) provided by the consumers/providers 401, the reference model or content reliability from storage providers 403, or a combination thereof. However, even though the workload model is valuable for the local workload forecasting, it does not have an actual relationship with the workload models of other storage providers 405a, 405b, ..., 405n provided by their own local workload estimators (WEs) 407a, 407b, ..., 407n. Using such relationships between storage providers 401 and 405a-405n a distributed storage management mechanism can be developed.

In one embodiment, the central workload estimator 209 provides a mechanism for relating the local workload estimators 407a-407n and establishes an aggregated workload model (shown by arrow 411) based on the local workload models of each storage providers 405a-405n, through MIMO model shown as MIMO system entity 409. It is noted that the distributed data management in the form of predictive control in cooperation with relationship management and information trajectory construction, as described, provides estimation and prediction of connectivity issues as well as structural changes of distributed storage system.

Furthermore, it is noted that in order to construct a model of a certain type of system (or part of the system) the system or its components should be identified in a blind way (as black-boxes). The main idea of such identification is to determine basic transfer characteristics of system (or components) for the further analysis and a certain type of model creation. A typical approach in this case is to capture input and output signals of a system and use a certain analysis to identify the system model. To undertake such identification, the time-series of input and output signals can be processed with Fast Fourier transform (FFT) to the frequency domain, to determine spectral characteristics of the system.

In one embodiment, from device connectivity point of view three states can be determined as disconnected, connected and transitional state between them. All the three states are exploited by workload models and are monitored by the central workload estimator 209, the local workload estimators 407a-407n, or a combination thereof.

In one embodiment, any request burst or content access pattern by a provider/consumer such as a UE 107a-107i, a process of the computation spaces 115a-115m, or a combination thereof, is clearly identified by the filtering module 207 based on one or more appropriate spectrum components.

In one embodiment, for a repeatable run-time spectrum component such content access pattern is defined by the criticality module 203 as a reliable request and, consequently, as a reliable connection with corresponding request owner. However, for a non-repeatable run-time spectrum component the criticality module 203 defines such content access patter as a non-reliable request and, consequently, any corresponding request owner is recognized as a suspect to be recognized as a non-reliable.

In one embodiment, the data backup platform 103 maintains a robust relationship between reliable request owners and forecasts a break point when any reliable request owner becomes non-reliable and vice versa. This can be achieved by the analysis of the request owner's history chain.

It is noted that, in order to create the described functionality, through a spectrum components analysis, a certain form of spectral forecasting procedure should be in place. It is important to note that such procedure should be applicable for single-input single-output (original FF scheme), single-input multiple-output (recombination of FF scheme with multiple output), multiple-input single-output (target model), or a combination thereof. The most general case, multiple-input multiple-output (MIMO) model can be considered as a recombination of all the cases stated.

It is further noted that, model identification process is based, at least in part; on observation of input/output signals (access bursts or just requests) thus a signal consistency checking is necessary. Wavelet analysis can provide checking that can ensure that observed signal (which is taken within time window) is consistent. One of the main benefits of such approach is the ability to capture the consistency of the whole system. It means that the reliability of the systems' input-output signals is checked as well as a consistency of system transfer characteristics.

It is also noted that, the MIMO modeling approach is flexible in redefinition of inputs/outputs and generalization of non-square models. From the practical point of view it means a simple and robust mechanism of increasing/decreasing complexity while maintaining the system in boundaries of stable operational modes. Such approach can be efficiently applied for modeling an uncertain and changeable environment. According to the targeted environment (distributed storage infrastructure with multitude of uncertainties) model can fit and describe the cases such as (1) joining node, new input AND output synthesis (AND because while online, a node can behave as input and output), (2) leaving node, input OR output removal (OR because the moment of removal can identify only one of the possible type, input or output) wherein two sub-cases can be recognized as (2a) voluntary leaving process (this defines correct and in-order de-registration and any link/pointer removal process from the routing table), from the MIMO model perspectives it means controllable pole which is moving towards the boundary of the stability area; thus can be observed and potential result predicted, and (2b) non-voluntary leaving process (this defines any type of failure, it means incorrect and out-of-order leaving, including omitting any de-registration process). (3) update node, no input/output related topology activity (by definition should provide mechanism of stability status update), and (4) node under normal operation.

In one embodiment, considering N storage consumers that are willing to communicate with M storage providers, and assuming that a set k of simultaneous transfers takes place, the following model for this multi-access environment can be constructed (MIMO basic definition):

$$y_k = H_k s_k + W_k \quad (1)$$

wherein, $S_K = (S_1, S_2, \ldots, S_{|K|})^{|T|}$ is the transferred data vector which comprises of k packets; each is transmitted with a power P, with reliability factor R and latency L.

Furthermore, $H_k = (h_1, h_2, \ldots, h_{|k|})$ is M*|k| workloads cross-coupling matrix (eventually provides storage management subsystem characteristics), where the $h_{j,i}$ represents the impact from i-th storage consumer in the set of k at the j-th storage provider and are in the state-space of $\xi(P, R, L)$. The vector $w_k$ can be complex-valued characteristics of uncertainties, modeled by means of noise. In fact $h_{j,i}$ is a combined weight function of power, reliability and latency parameters and can be represented in the form of $h_{j,i} = \phi P + \rho R + \sigma L$, where $\phi, \rho, \sigma$ are corresponding weights (or weight functions).

In one embodiment, for example, the system may need to consume minimum power while maintaining the reliability and latency factors within a certain range. Additionally, the system may need to provide a guaranteed latency factor while keeping reliability factor within a thresholds and tracking power consumption and minimizing it in any possible way. As a result of these conditions, two main stages are essential to construct a distributed workload model and corresponding predictive control. Firstly, the system $h_{j,i}$ is identified as a black-box (blind identification). The local workload estimators 407a-407n (N-input M-output system identification) can be considered as parts of the MIMO model. Secondly, the control mechanism of identified model is constructed using weight functions. The predictive control is based on content (data) providers/consumers workload estimation feed-forward component models.

In one embodiment, various backup mechanisms such as, for example skewed backup 413, non-uniform backup 415, or a combination thereof is used.

In one embodiment, the central workload estimator 209 manages the support facilities for the skewed data backup 413 and the non-uniform content backup 415 by constructing behavioral models of the access patterns.

In one embodiment, a backup content distribution (not shown) cooperates with the central workload estimator 209 during all operational time. A backup content distribution can serve the role of a black-box that can be predicted with help of workload model approximation method (ex. ARIMA) and therefore is used for the storage control framework. In that sense autoregressive models capture input/output behavior of that black-box.

In one embodiment, the request rate, not only for a particular data object, but for the whole storage provider (consumer/provider 401) is considered. The access pattern can be formed as a combination of Read and Write requests that are issued at a certain request rate by consumers or producers. The workload model used by the central workload estimator 209, the local workload estimators 407a-407n, or a combination thereof, represents forecasted request rate of a system (e.g. a UE 107a-107i) payload as a function y(t) that depends on series of actual request rate $x_i$ (t) (Read and Write requests). As an example, workload model estimation can use the following general form:

$$y(t) = \sum_{m=0}^{M} \alpha_m y(t-m) + \sum_{l=0}^{L} \beta_l x_i(t-l) \quad (2)$$

The formula (2) can be derived from the general form of AutoRegression (3) and from the general form of Moving Average (4)

$$y(t) = \sum_{m=0}^{M} \alpha_m y(t-m) + x_i(t) \quad (3)$$

$$y(t) = \sum_{l=0}^{L} \beta_l x_i(t-l) \quad (4)$$

The values of L and M above show the Moving Average and AutoRegressive orders and are determined beforehand. Coefficients $\alpha_m$, $\beta_l$ can be identified using frequency transform methods such as, for example, Fast Fourier Transform (FFT) because spectrum domain and model coefficients have the same information.

In one embodiment, in order to realize the statements above, a feed-forward control scheme for the distributed storage model can be defined. Using feed-forward workload estimation and predictive workload detection the most relevant content (data) can be identified and reassigned.

It is important to note that local content backup mechanisms can be managed by feed-forward component. According to the estimated workload, feed-forward component can elaborate the necessary impacts on content backup and represent appropriate impacts from any remote request (consumer/provider 401).

In one embodiment, the MIMO model identification and predictive control design can be determined using any known techniques. In general, having estimated cross correlation and correspondingly cross power spectrum, a recombined spectrum domain analysis is undertaken. It can be estimated through cross cumulant spectrum analysis.

In one embodiment, as an initial step, a cross polyspectra matrix for magnitude and for phase retrieval is estimated. The main purpose of using the matrix is to separate repeatable run-time (RRT) spectrum component and non-repeatable run-time (NRRT) components, and, to predict break points when the transformation between them happens (direct and indirect way). By definition, the RRT spectrum component identifies a most relevant content access and also can be recognized as a reliable request. On the contrary, the NRRT spectrum component identifies all least relevant content access and can be recognized as a non-reliable request. Spectrum component type identification process, in fact, is based on basic stability analysis. It means, while constructing a workload model by means of the coefficients identification in spectrum domain, an appropriate model stability analysis can be undertaken. The model stability analysis can identify fluctuations between RRT and NRRT states of spectrum components.

In one embodiment, following the stability analysis, calculation of the system model can be undertaken and the reconstruction of the whole system model can follow. During the reconstruction a necessary optimization through error estimation and tracking can be done.

In one embodiment, multiple devices may be collaborating (connected and interacting via shared content). Since every device has a workload model, every model can reflect a certain impact from any other workload model of any other device. By means of such impacts a correlation aspect can be identified. Any existing correlation aspect can be unified under a MIMO system. In that sense, parameters that were stated above (RRT and NRRT) can be recognized as aspects of such correlation.

As was previously stated, access pattern to any content is formed as a combination of Read and Write requests that are issued at a certain request rate by consumers or producers 401. In general, any particular workload model represents forecasted request rate of a system (e.g. UE 107a-107i) payload as a function y(t) that depends on series of actual request rate $x_i(t)$ (Read and Write requests).

In one embodiment, each workload model reflects a certain impacts not only from local accesses, but from any external consumer/provider 401. It means that such impacts (spectrum components, in case of frequency domain analysis) should have major visible shape in such external workload model and minor visible shape in any workload model which has been remotely accessed by content consumer/provider 401.

In one embodiment, a multitude of workload estimator models can be presented in the form of a consolidated entity with multiple-input and multiple-output channels. To the better extent, according to the actual computing environment the number of such entities can be more than one. It means that consolidation process can be justified to the needs of a certain environment. By means of that overall flexibility can be improved.

Figure 4B:
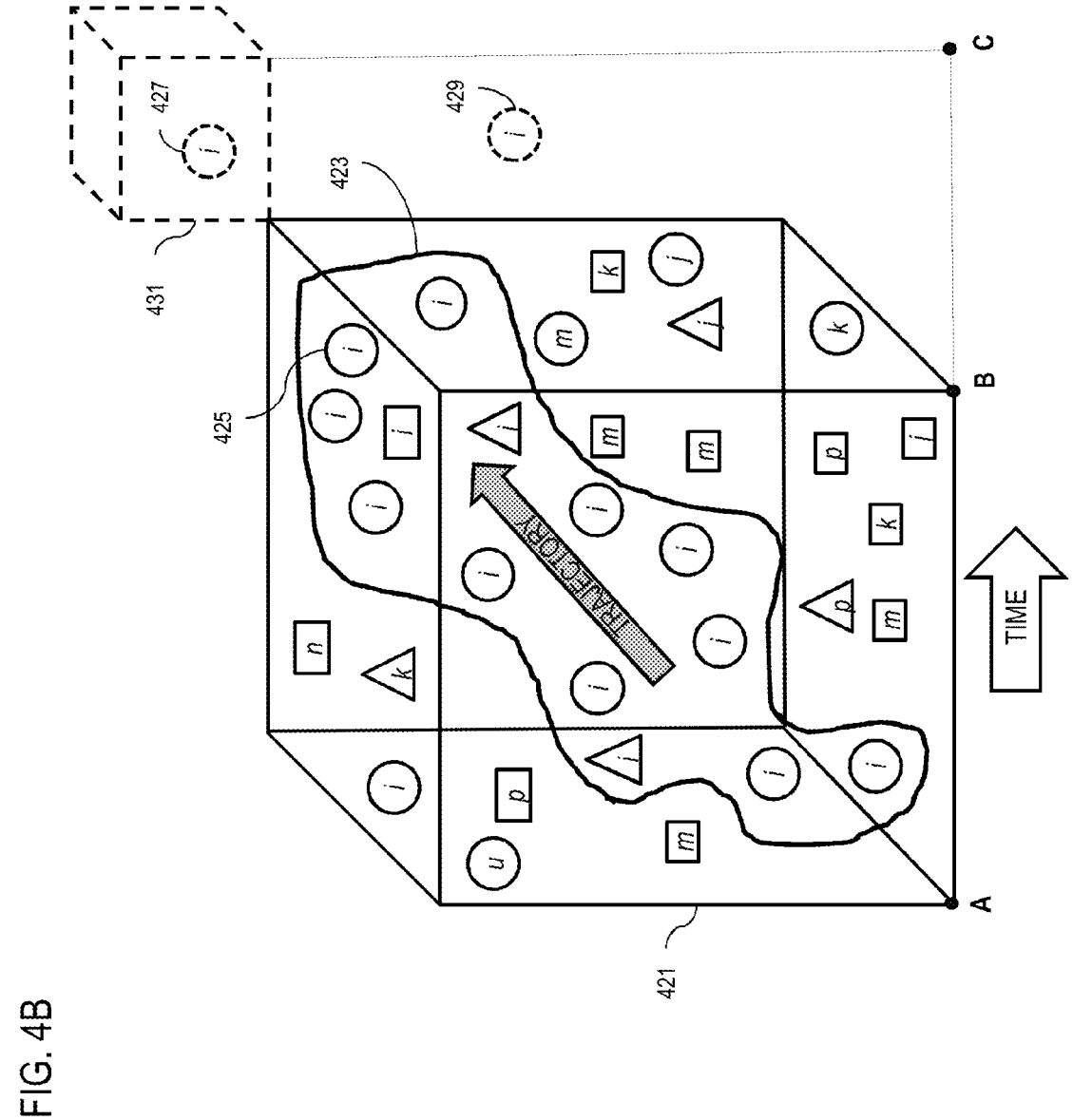
FIG. 4B is a diagram of state trajectory for information management processes, according to one embodiment.

FIG. 4B is a diagram of state trajectory for a sequence of social graph information management processes, according to one embodiment. The data backup platform 103 may keep, for example in storage 211, a sequence of states for each of a plurality of information management processes, over a period of time from time A to time B. Cube 421 in FIG. 4B represents a three dimensional space consisting of information management processes i, j, k, m, n, p, . . . and their states during a time period from A to B. It is contemplated that the approach described herein is applicable to any multi-dimensional space. In FIG. 4B, active states of processes are shown with circles, inactive states are shown with squares, and transitional states are shown with triangles. A sequence of the consecutive states of a process can be used to describe any evolving behavior of an intelligent information management process in non-monotonic case as an infinite set of inactive (stable), active (unstable) and transition (uncertain) states.

By extending the definitions of the states, the intelligent information management process is represented as a particular model that follows a certain type of state trajectory (or attractor) in a multidimensional state space that is sampled by means of stable and unstable states. An attractor is a set to which a dynamic system evolves after a long enough time. That is, points that get close enough to the attractor remain close even if slightly disturbed. A trajectory of the dynamical system in the attractor does not have to satisfy any special constraints except for remaining on the attractor.

As seen in FIG. 4B, the space within the closed line 423 represents a trajectory of active states (circles) for information management process i between time points A and B. The state trajectory generator 201 of the data backup platform 103 may predict a finite set 431 of future states (between time point B and time point C) for process i based on the calculated trajectory 423.

In an exemplary embodiment, assuming that circle 425 represents the last state of process i before time point B, based on state trajectory 423 from possible next states 427 and 429, state 427 will be the more likely to happen because it is within the range of predicted future states. Therefore, in order to determine recyclability of an information fragment F (not shown), the state trajectory generator 201 checks the recyclability of the information fragment F for all the relevant information management processes until at least one (or a predefined number) of processes are found that may be able to reutilize the information fragment F in the near future. Assuming that process i is a relevant process for the information fragment F and predicted state 427 can benefit from the information fragment F, then the information fragment F can be determined as recyclable for process i. Otherwise, if the information fragment F is determined to be reusable for a state (such as 429 which is too far off from the predicted future states for process i), then the state trajectory generator 201 may identify information fragment F as non-recyclable for process i since the probability of it being reused within time frame B to C is low.

Figure 5:
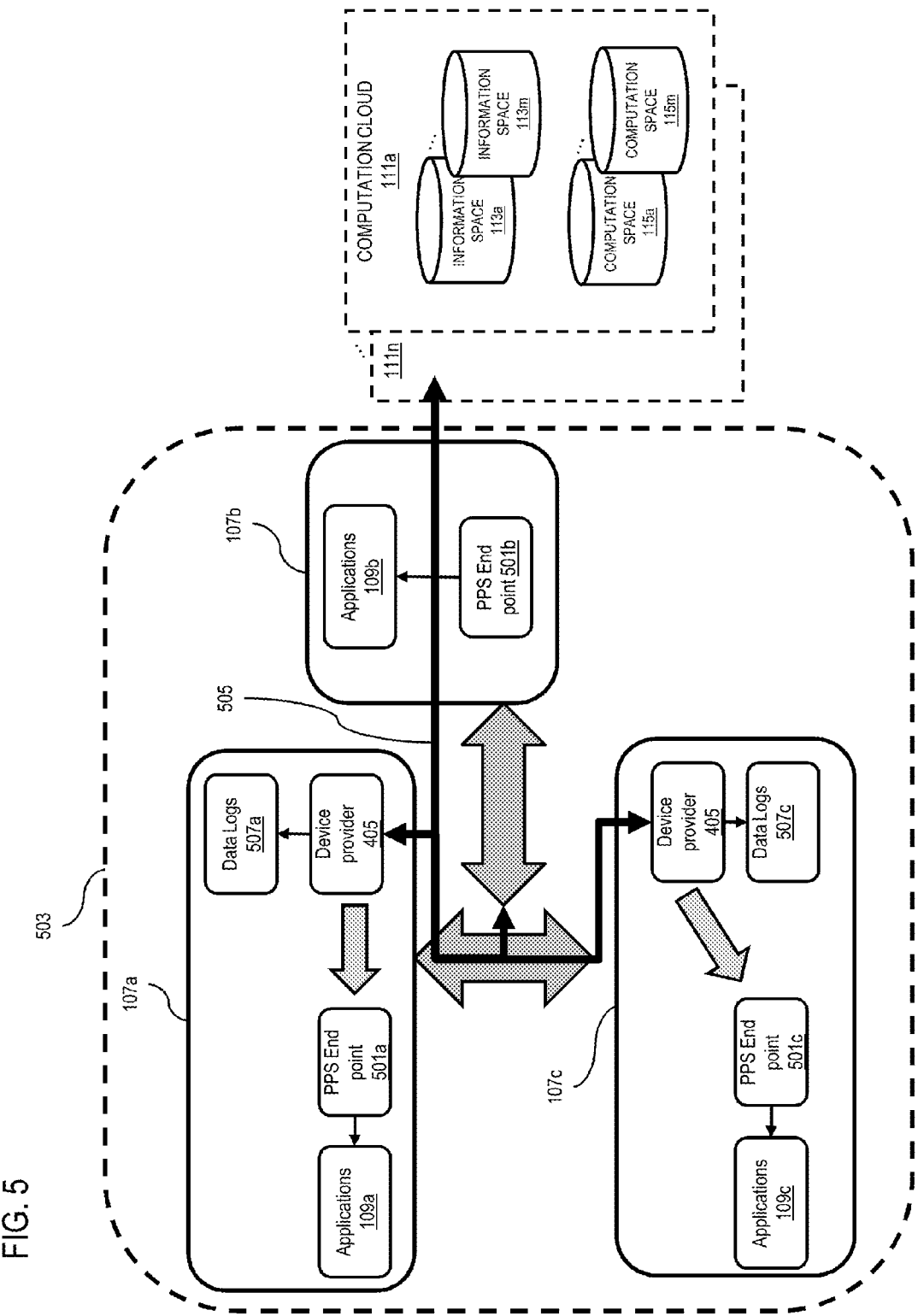
FIG. 5 is a diagram of a personal cloud, according to one embodiment.

FIG. 5 is a diagram of a personal cloud, according to one embodiment. In one embodiment, users own and control all aspects of their own data via interfaces presented on UE 107a-107i, on their own user hosted personal cloud 503 composed on devices 107a-107i associated to the user.

In one embodiment, UEs 107a, 107b, and 107c belong to the same user and in combination provide a personal cloud 503 for the user. A UE 107a or 107c may include data logs 507a and 507c respectively, as part of their storage 507a, and 507c. In this embodiment, UE 107b does not include a data log. Furthermore, a UE 107a-107c may include a collection of applications 109a-109c which may include trusted application such as, for example, a search application that functions in accordance with the data backup platform 103.

In one embodiment, each user has a personal profile stronghold (PPS) that can be accessed by the UE 107a, 107b, or 107c as a website via a URL, by a Uniform Resource Identifier (URI), or a combination thereof via PPS endpoints 501a, 501b, or 501c. The PPS allows the user to select their trusted applications to be included in applications 109a-109c, configure the trusted applications, visualize data collected by the trusted applications, etc.

In one embodiment, a user may set a default as to how they desire to be seen by third party tracking sites, etc. For example, a user may choose to be anonymous (completely invisible to the entities external to the personal cloud 503), pseudo anonymous (anonymous to any entities outside their current session), or fully disclosed (visible to all entities). An anonymous user will be seen as a different person by other entities with each web hit. However, a pseudo anonymous user will be seen as the same person within a session, but not between different sessions. For example, after closing a browser screen and starting a new session other entities are not able to recognize the user as the same user from previous session.

In one embodiment, the applications 109 may include a personal data collector application to collect data from communications between UEs 107a-107c, between UEs 107a-107c and cloud 111, or a combination thereof.

In one embodiment, each application 109 can access a data log 507, extract relevant information and write the extracted information into a local storage unit, an information space 113a-113m, or a combination thereof. Furthermore, the computations associated with personalization process and creation of personal cloud 503 can be decomposed into their elemental computation closures in computation spaces 115a-115m of clouds 111a-111n.

In one embodiment, the stored information on UEs 107a, 107b, and 107c are synchronized with each other and with computation clouds 111a-111n as shown by arrows 505. The synchronization enables the user to run their processes on clouds 111a-111n whenever resources on UEs 107a-107c are insufficient for the personal cloud 503 to perform the required processes.

Figure 6A:
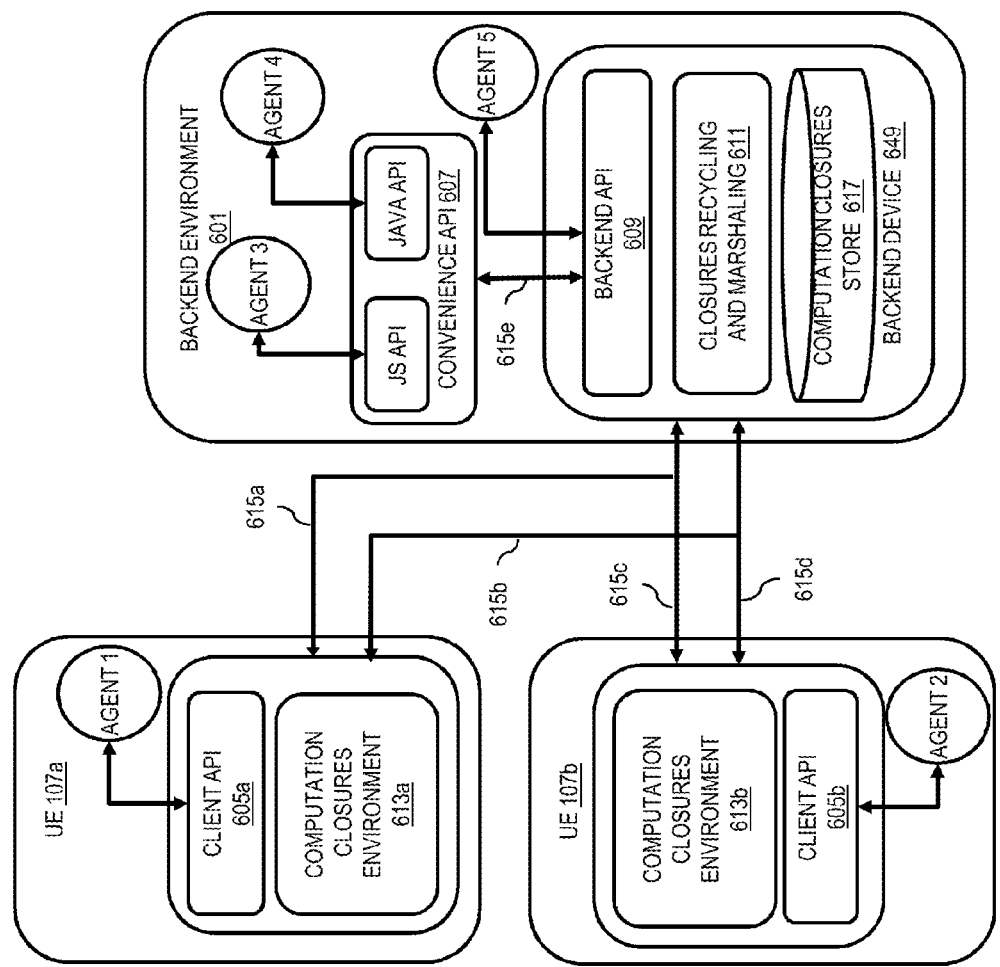
FIGS. 6A-6B are diagrams of computation distribution among devices, according to various embodiments.
Figure 6B:
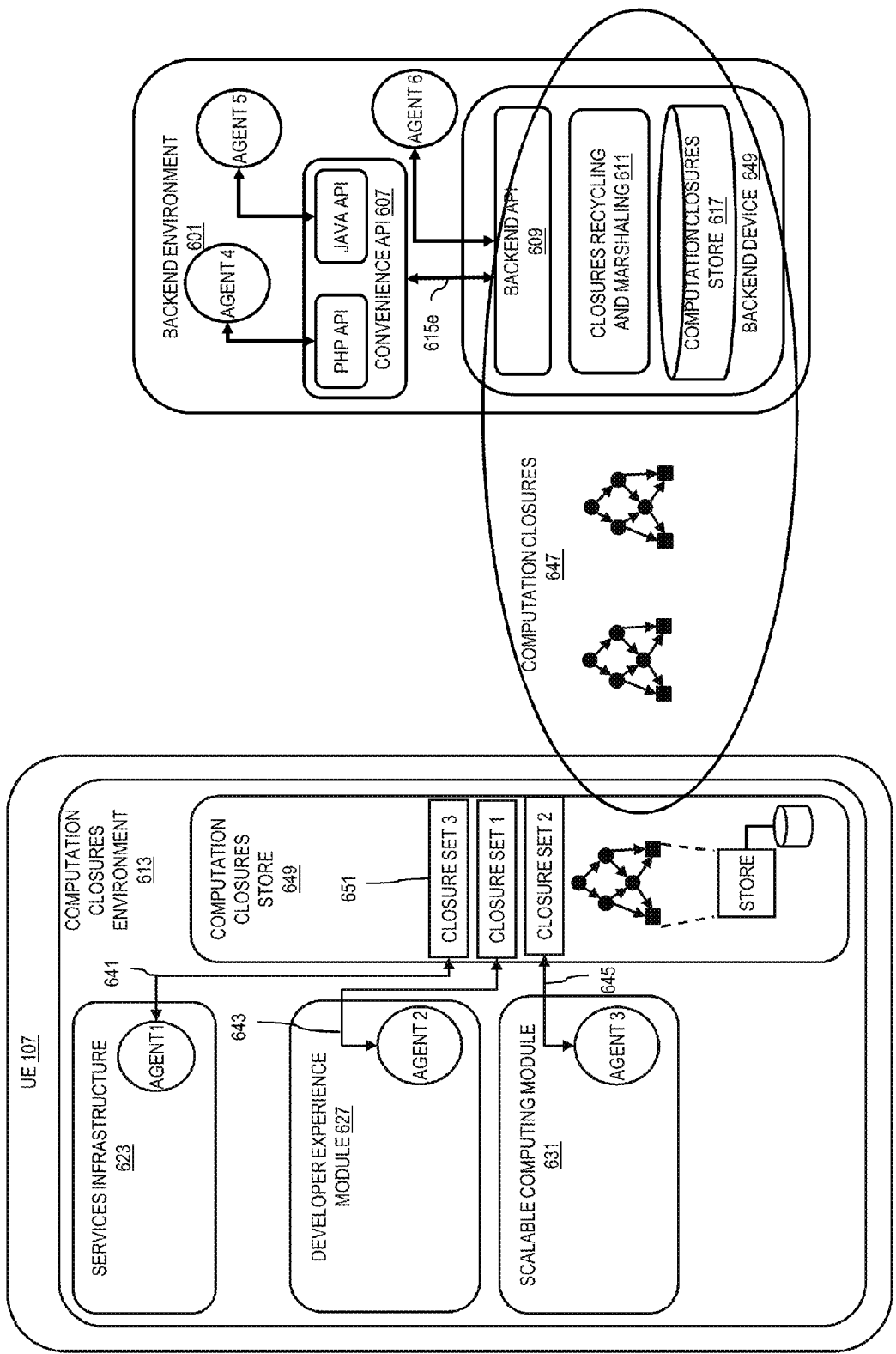

FIGS. 6A-6B are diagrams of computation distribution among devices, according to various embodiments. In one embodiment, in FIG. 6A, the backend environment 601 is a network infrastructure. The backend environment may also be a virtual run-time environment within a cloud 111 associated with the owner of UE 107a or on another UE 107b associated with the user. The backend environment 601 may include one or more components (backend devices) 649 and one or more Application Programming Interface (API) such as a convenience API 607 that may include APIs tailored to the software development environments used (e.g. JAVA, PHP, etc.). Furthermore, UEs 107a and 107b may include client APIs 605a and 605b. Each API enables interaction between devices and components within another device or an environment. For example, backend API 609 enables interaction between the backend device 649 and Agent5, and convenience API 607 enables interaction between the backend device 649 and agents Agent3 and Agent4, wherein each agent is a set of processes that handle computation closures within the backend environment 601. APIs 605a and 605b enable interaction between UE 107a and agent Agent1, and UE 107b and agent Agent2 respectively. As seen in the example of FIG. 6A, Agent3 works under PHP while Agent4 is a JAVA process. Each of the UEs 107a and 107b has a computation closure environment 613a and 613b which may be part of a cloud 111. Arrows 615a-615e represent distribution path of computation closures among the environments 613a, 613b and the computation closures store 617. The computation closures store 617 is a repository of computation closures that can be accessed and used by all the UEs and infrastructure components having connectivity to the backend environment 601.

In one embodiment, the backend device 649 may be equipped with a closure recycling and marshaling component 611 that monitors and manages any access to the computation closures store 617. In other embodiments the closure recycling and marshaling (i.e. standardization for uniform use) may be a function of the data backup platform 103.

In one embodiment, the computation closures within environments 613a, 613b and the computation closures store 617 may be composed based on anonymous function objects and automatically created by a compiling system using methods for generating anonymous function objects such as lambda expressions.

FIG. 6B is an expanded view of a computation closure environment 613 as introduced in FIG. 6A. The computation closure environment 613 may be composed of one or more computation closure generating components. In one embodiment the computation closure environment 613 has a services infrastructure 623 that provides various services for the user of the UE 107. The services may include any application that can be performed on the UE 107 such as, games, music, text messaging, voice calls, etc. In one embodiment, the services infrastructure 623 provides support for closure distribution under the supervision of an data backup platform 103 as discussed in FIG. 1, FIG. 2, and FIG. 3. The agent Agent1 retrieves the computation closures required by the services infrastructure 623 from the computation closures store 649 and stores the newly generated computation closures by the services infrastructure 623 into the computation closures store 649 for distribution purposes per arrow 641.

In another embodiment, the computation closure environment 613 has a developer experience module 627 that provides various tools for a developer for manipulating services offered by the UE 107. The tools may include standardized and/or abstract data types and services allowing the developers to chain processes together across development platforms. In one embodiment, the developer experience module 627 provides cross platform support for abstract data types and services under the supervision of an data backup platform 103 as discussed in FIG. 1. The agent Agent2 retrieves the computation closures required by the developer experience module 627 from the computation closures store 649 and stores the newly generated computation closures by the developer experience module 627 into the computation closures store 649 for distribution purposes per arrow 643.

In yet another embodiment, the computation closure environment 613 has a scalable computing module 631 that provides an abstract wrapper (i.e. monadic wrapper) for the transmitting closures 651. This abstraction provides computation compatibility between the closure sets 651 and the UE 107. The abstract wrapper may provide scheduling, memory management, system calls and other services for various processes associated with the closures 651. These services are provided under the supervision of the data backup platform 103 as discussed in FIG. 1. The agent Agent3 retrieves the computation closures required by the scalable computing module 631 from the computation closures store 649 and stores the newly generated computation closures by the scalable computing module 631 into the computation closures store 649 for distribution purposes per arrow 645. In one embodiment, the backend environment 601 may access the computation closures store 649 and exchange/transmit one or more computer closures 647 between the computation closures store 649 and the backend computation closures store 617.

Figure 7A:
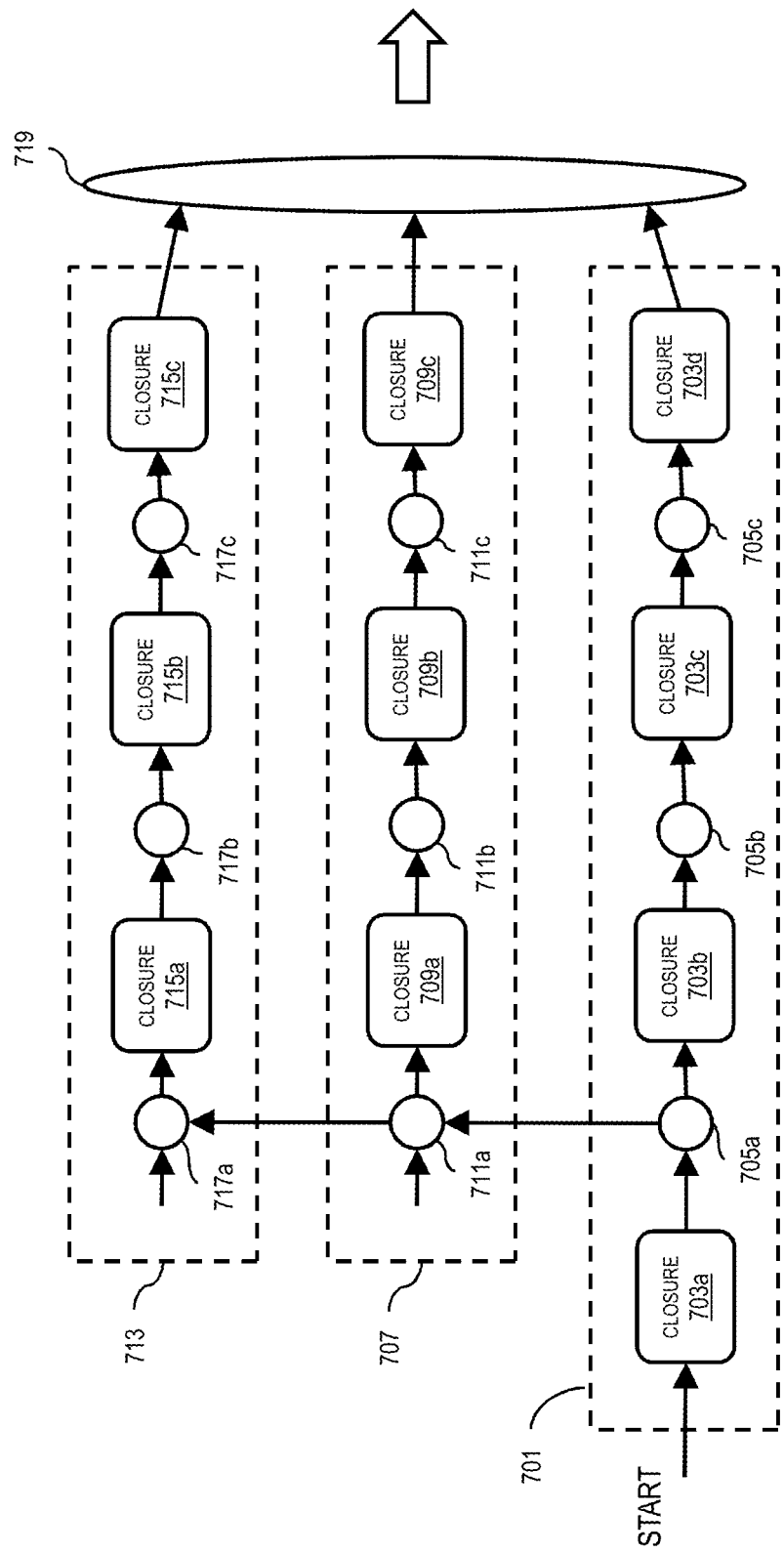
FIGS. 7A-7B are diagrams of computation distribution and load balancing in multi-level computation closure architecture, according to one embodiment.
Figure 7B:
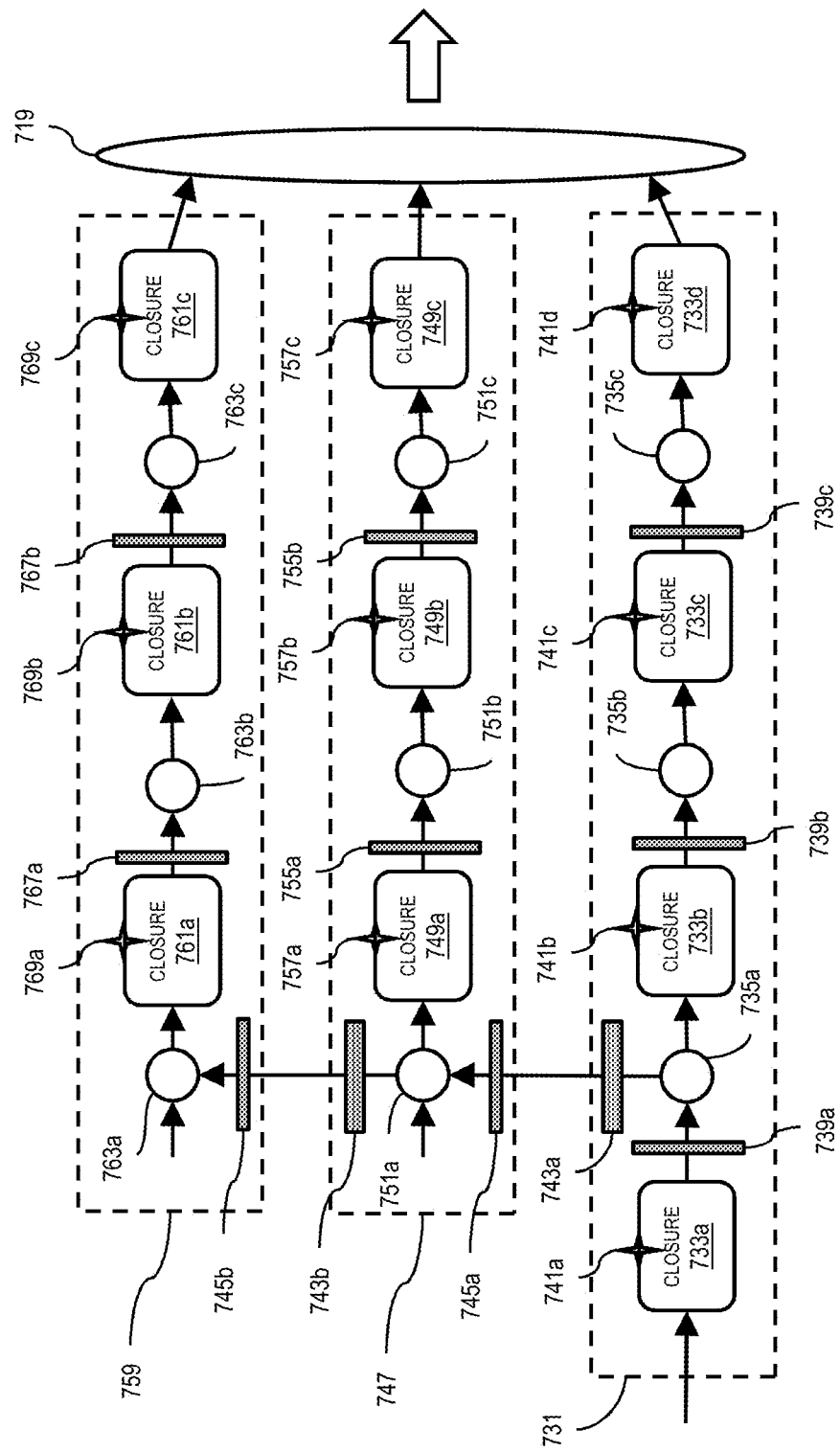

FIGS. 7A-7B are diagrams of computation distribution and load balancing in multi-level computation closure architecture, according to one embodiment. FIG. 7A is a general representation of computation distribution. As seen in FIG. 7A, the computation distribution starts at a component 701 of an architectural level (not shown). Each component may execute a set of closures that constitute a computation branch. For example, the branch 701 is composed of closures 703a-703d, wherein every two consecutive closures are connected via a connector and computational branches are communicating via connectors as well. For example, connectors 705a-705c connect closures 703a-703d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flows, distribution maps, links between closures and architectural levels, etc. Arrows connecting closures to connectors and connectors to next closures show the functional flow adopted based on the parameters. As seen in FIG. 7A, the closures have been distributed from component 701 to component 707 via communication between connector 705a and connector 711a. The computation branch of component 707 includes closures 709a-709c communicating via connectors 711b and 711c, while branches 701 and 707 communicate via connectors 705a and 711a. Similarly, a third branch 713 has been formed of closures 715a-715c being executed at component 713 and connected by connectors 717b and 717c, while the branch communicates with other branches via connector 717a. The final results from closure execution of the three branches 701, 707, and 713 are aggregated (719) by the search nodes 117, by applications 109a-109i, or a combination thereof, and forwarded to the requesting device.

In one embodiment, the initial branch 701 may be in a UE 107a-107i, the second branch 707 in a component of the infrastructure 117a-117n, and the third branch in another component of the same infrastructure, a different infrastructure, in a cloud, or a combination thereof.

FIG. 7B shows a computation distribution together with various parameters affecting the distribution. As seen in FIG. 7B, the computation distribution starts at a component 731 of an architectural level (not shown). Each component may execute a set of closures that constitute a computation branch. For example, the branch 731 is composed of closures 741a-741d, wherein every two consecutive closures are connected via a connector and computational branches are communicating via connectors as well. For example, connectors 735a-735c connect closures 733a-733d. Connectors may also transfer information and data associated with a closure and its execution results to the next closure in the branch or to other branches. Additionally, connectors may function as links between related branches that constitute a distributed computation.

In one embodiment, connectors may contain information about parameters such as capabilities, functional flow specifications, distribution maps, links between closures and architectural levels, etc. Arrows connecting closures to connectors and connectors to next closures show the functional flow adopted based on the parameters. For example, star signs 741a-741d, 757a-757c, and 769a-769c may represent capability parameters associated with each closure 733a-733d, 749a-749c, and 761a-761c respectively. Additionally, blocks 739a-739c, 755a-755b, 767a-767b, and 743a-743b may represent cost values. For example, the cost value 739a may show the cost for binding closure 733b to closure 733a and directs closure 733b to branch 731, via connector 735a, as the next closure to be executed after closure 733a. The closures may be initially assigned with priority levels, so that less important closures can be omitted if necessary. Similarly, cost values 739b and 739c direct closures 733c and 733d in branch 731 via connectors 737b and 737c. In a higher level of hierarchy, the cost value 745a directs closures 749a-749c to component 747 and similarly the cost value 745b directs closures 761a-761c to component 759. Additionally in branch 747, connectors 751a-751c and cost values 755a and 755b direct closures 749a-749c down the path of branch 747. Similarly, in branch 759, connectors 763a-763c and cost values 767a and 767b direct closures 761a-761c down the path of branch 759. The final results from closure execution of the three branches 731, 747, and 759 are aggregated (shown by arrow 719) and forwarded to the requesting device.

The processes described herein for providing criticality based data backup may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
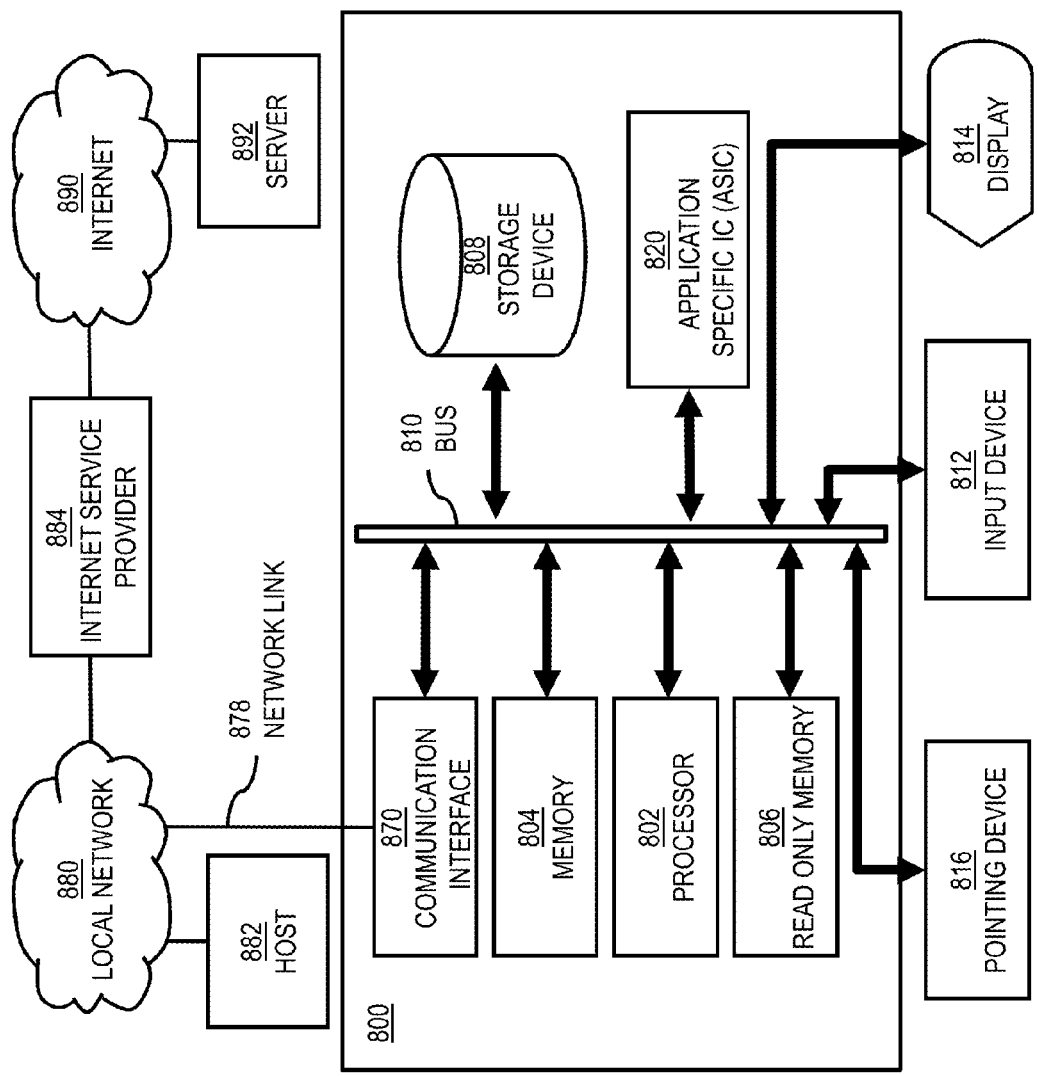
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide criticality based data backup as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing criticality based data backup.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing criticality based data backup. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or any other dynamic storage device, stores information including processor instructions for providing criticality based data backup. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or any other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing criticality based data backup, is provided to the bus 810 for use by the processor from an external input device 812, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT), a liquid crystal display (LCD), a light emitting diode (LED) display, an organic LED (OLED) display, a plasma screen, or a printer for presenting text or images, and a pointing device 816, such as a mouse, a trackball, cursor direction keys, or a motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of ASICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing criticality based data backup to the UEs 107$a$-107$i$ of sets 101$a$-101$n$.

The term "computer-readable medium" as used herein refers to any medium that participates in providing information to processor 802, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or any other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide criticality based data backup as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of functions. Chip set or chip 900, or a portion thereof, constitutes a means for performing one or more steps of providing criticality based data backup.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide criticality based data backup. The memory 905 also stores the data associated with or generated by the execution of the inventive steps.

Figure 10:
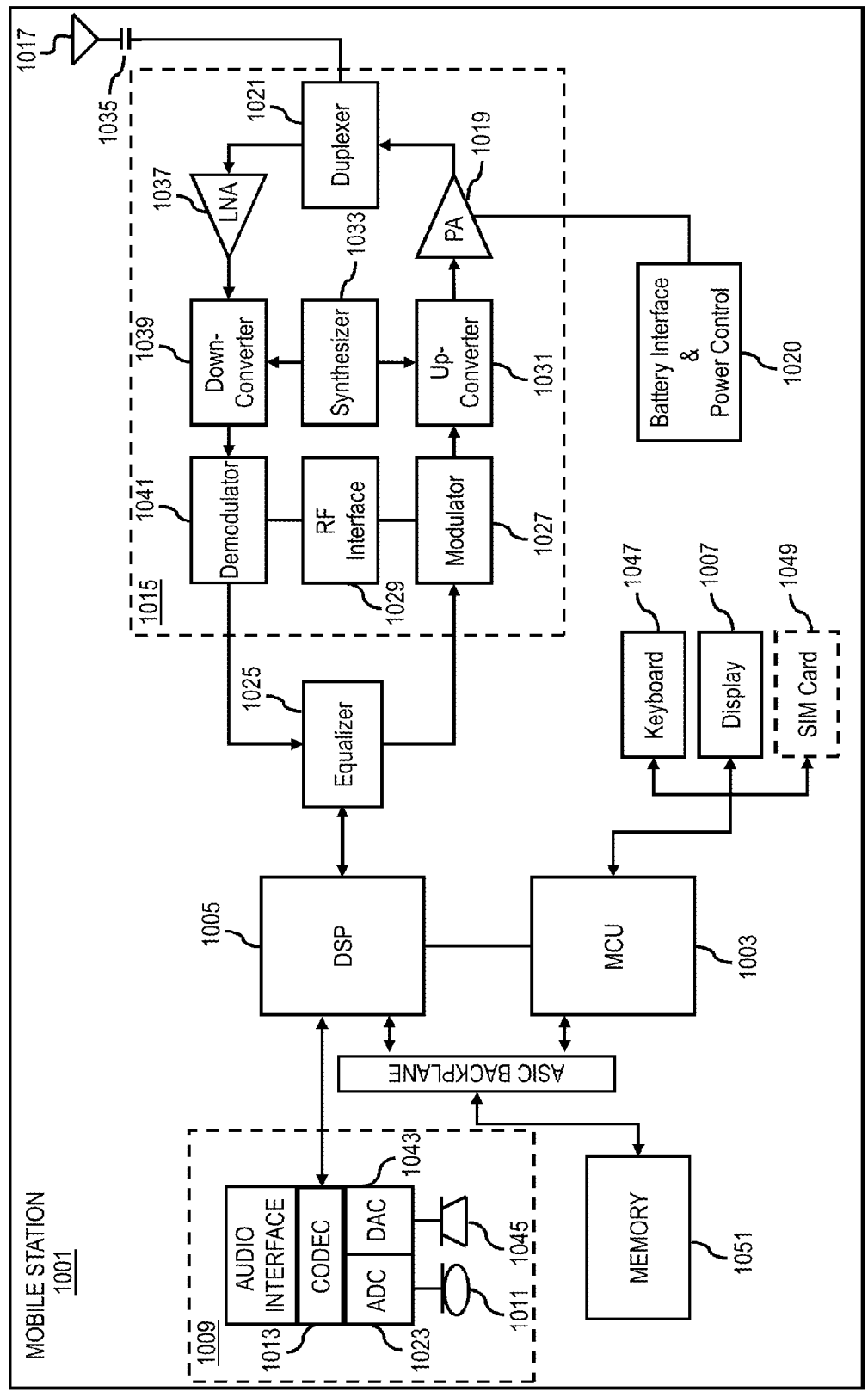
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1001, or a portion thereof, constitutes a means for performing one or more steps of providing criticality based data backup. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing criticality based data backup. The display 1007 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003 which can be implemented as a Central Processing Unit (CPU).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide criticality based data backup. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art.

The memory device 1051 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   processing of one or more state trajectories to determine criticality information associated with one or more data items of at least one information space, wherein the one or more state trajectories are associated with one or more information management processes operating on the at least one information space; and
   determining (a) one or more data backup processes, (b) one or more data restoration processes, (c) one or more parameters for the one or more data backup processes, the data restoration processes, or a combination thereof, or (d) a combination thereof based, at least in part, on the criticality information,
   wherein a state trajectory provides a mapping of information flow through the at least one information space and defines a finite set of possible future states for each of the one or more information management processes at given point in the nearest future, wherein the mapping comprises a geometrical representation of a trajectory of an active state for each of the one or more information management processes, and
   wherein only the one or more data items that are critical, based at least upon the critically information, are included in the data backup process, the data restoration process, or combination thereof.

2. A method of claim 1, further comprising:
   processing of the one or more state trajectories to determine time-sensitivity information associated with the one or more data items,
   wherein (a) the one or more data backup processes, (b) the one or more data restoration processes, (c) the one or more parameters for the one or more data backup processes, the data restoration processes, or a combination thereof, or (d) a combination thereof are based, at least in part, on the time-sensitivity information.

3. A method of claim 1, further comprising:
   processing of the one or more state trajectories to determine one or more future states of the one or more information management processes, the at least one information space, the one or more data items, or a combination thereof,
   wherein determining (a) the one or more data backup processes, (b) the one or more data restoration processes, (c) the one or more parameters for the one or more data backup processes, the one or more data restoration processes, or a combination thereof, or (d) a combination thereof are based, at least in part, on the one or more future states.

4. A method of claim 3, further comprising:
   filtering of the one or more future states based, at least in part, on one or more patterns, wherein the one or more patterns are associated with one or more historical observations of the one or more state trajectories.

5. A method of claim 1, further comprising:
   determining power consumption information, performance information, reliability information, or a combination thereof associated with the at least one information space, the one or more information management processes, the one or more data backup processes, the one or more data restoration processes, or a combination thereof,
   wherein determining (a) the one or more data backup processes, (b) the one or more data restoration processes, (c) the one or more parameters for the one or more data backup processes, the one or more data restoration processes, or a combination thereof, or (d) a combination thereof are based, at least in part, on the power consumption information, the performance information, the reliability information, or a combination thereof.

6. A method of claim 5, wherein:
   determining the power consumption information, the performance information, the reliability information, or a combination thereof is based, at least in part, on one or more workload models.

7. A method of claim 6, further comprising:
   binding of the one or more workload models with the one or more state trajectories.

8. A method of claim 6, further comprising:
   determining to establish a relationship among the one or more workload models and one or more other workload models associated with one or more storage providers associated with the at least one information space, one or more other information spaces, or a combination thereof.

9. A method of claim 8, wherein the relationship is based, at least in part, on a multiple-input multiple-output (MIMO) model, a single-input single-output (SISO) model, or a combination thereof.

10. A method of claim 6, wherein the one or more workload models are local workload models, aggregated workload models, or a combination thereof.

11. An apparatus comprising:
    at least one processor; and
    at least one memory including computer program code for one or more programs,
    the at least one memory and the computer program code configured to, with the at least one processor, cause the apparatus to perform at least the following;
    determine one or more state trajectories associated with one or more information management processes operating on at least one information space;
    process and/or facilitate a processing of the one or more state trajectories to determine criticality information associated with one or more data items of the at least one information space; and
    determine (a) one or more data backup processes, (b) one or more data restoration processes, (c) one or more parameters for the one or more data backup processes, the data restoration processes, or a combination thereof, or (d) a combination thereof based, at least in part, on the criticality information, wherein a state trajectory provides a mapping of information flow through the at least one information space and defines a finite set of possible future states for each of the one or more information management processes at given point in the nearest future, wherein the mapping comprises a geometrical representation of a trajectory of an active state for each of the one or more information management processes, and wherein only the one or more data items that are critical, based at least upon the critically information, are included in the data backup process, the data restoration process, or combination thereof.

12. An apparatus of claim 11, wherein the apparatus is further caused to:
process and/or facilitate a processing of the one or more state trajectories to determine time-sensitivity information associated with the one or more data items,
wherein (a) the one or more data backup processes, (b) the one or more data restoration processes, (c) the one or more parameters for the one or more data backup processes, the data restoration processes, or a combination thereof, or (d) a combination thereof are based, at least in part, on the time-sensitivity information.

13. An apparatus of claim 11, wherein the apparatus is further caused to:
process and/or facilitate a processing of the one or more state trajectories to determine one or more future states of the one or more information management processes, the at least one information space, the one or more data items, or a combination thereof,
wherein the determination of (a) the one or more data backup processes, (b) the one or more data restoration processes, (c) the one or more parameters for the one or more data backup processes, the one or more data restoration processes, or a combination thereof, or (d) a combination thereof are based, at least in part, on the one or more future states.

14. An apparatus of claim 13, wherein the apparatus is further caused to:
determine one or more patterns associated with one or more historical observations of the one or more state trajectories; and
cause, at least in part, a filtering of the one or more future states based, at least in part, on the one or more patterns.

15. An apparatus of claim 11, wherein the apparatus is further caused to:
determine power consumption information, performance information, reliability information, or a combination thereof associated with the at least one information space, the one or more information management processes, the one or more data backup processes, the one or more data restoration processes, or a combination thereof,
wherein the determination of (a) the one or more data backup processes, (b) the one or more data restoration processes, (c) the one or more parameters for the one or more data backup processes, the one or more data restoration processes, or a combination thereof, or (d) a combination thereof are based, at least in part, on the power consumption information, the performance information, the reliability information, or a combination thereof.

16. An apparatus of claim 15, wherein the apparatus is further caused to:
determine the power consumption information, the performance information, the reliability information, or a combination thereof based, at least in part, on one or more workload models.

17. An apparatus of claim 16, wherein the apparatus is further caused to:
cause, at least in part, a binding of the one or more workload models with the one or more state trajectories.

18. An apparatus of claim 16, wherein the apparatus is further caused to:
determine to establish a relationship among the one or more workload models and one or more other workload models associated with one or more storage providers associated with the at least one information space, one or more other information spaces, or a combination thereof.

19. An apparatus of claim 18, wherein the relationship is based, at least in part, on a multiple-input multiple-output (MIMO) model, a single-input single-output (SISO) model, or a combination thereof.

20. An apparatus of claim 16, wherein the one or more workload models are local workload models, aggregated workload models, or a combination thereof.

21. A method of claim 1, wherein the state trajectory provides a mapping of information flow through the at least one information space by checking the recyclability of the criticality information.

22. An apparatus of claim 16, wherein the state trajectory provides a mapping of information flow through the at least one information space by checking the recyclability of the criticality information.

* * * * *